United States Patent
Wang et al.

(10) Patent No.: US 12,413,704 B2
(45) Date of Patent: Sep. 9, 2025

(54) PREDICTION VALUE DETERMINATION METHOD AND DECODER

(71) Applicant: GUANGDONG OPPO MOBILE TELECOMMUNICATIONS CORP., LTD., Guangdong (CN)

(72) Inventors: Jun Wang, Guangdong (CN); Fan Liang, Guangdong (CN); Heng Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 481 days.

(21) Appl. No.: 17/704,870

(22) Filed: Mar. 25, 2022

(65) Prior Publication Data
US 2022/0217335 A1  Jul. 7, 2022

Related U.S. Application Data

(63) Continuation of application No. PCT/CN2019/108598, filed on Sep. 27, 2019.

(51) Int. Cl.
*H04N 19/105* (2014.01)
*H04N 19/132* (2014.01)
(Continued)

(52) U.S. Cl.
CPC ........ *H04N 19/105* (2014.11); *H04N 19/132* (2014.11); *H04N 19/159* (2014.11); *H04N 19/176* (2014.11)

(58) Field of Classification Search
CPC .. H04N 19/105; H04N 19/132; H04N 19/159; H04N 19/176; H04N 19/523;
(Continued)

(56) References Cited

U.S. PATENT DOCUMENTS

| 2015/0139330 A1 | 5/2015 | Han et al. |
| 2017/0238011 A1* | 8/2017 | Pettersson ............... H04N 19/54 375/240.12 |

(Continued)

FOREIGN PATENT DOCUMENTS

| CN | 104363449 | 2/2015 |
| CN | 104702962 | 6/2015 |

(Continued)

OTHER PUBLICATIONS

Jang et al., "A New Intraframe Prediction Using Template Matching with Rotation," FIT 2012 (Forum on Information Technology 2012), pp. 299-300, The Institute of Electronics, Information and Communication Engineers, Information Processing Society of Japan, (2012). (Year: 2012).*

(Continued)

*Primary Examiner* — Hesham K Abouzahra
(74) *Attorney, Agent, or Firm* — Hodgson Russ LLP (57) ABSTRACT

A prediction value determination method and a decoder are provided. The method is for a decoder and includes the following. A bitstream is parsed to obtain a decoding parameter of a current block. A first template of the current block is obtained when the decoding parameter indicates that the current block uses a rotate template mode, where the first template contains a neighbouring reconstructed sample of the current block. A reference region of the current block is determined. In the reference region, a matching template of the first template is determined according to a reference template processing parameter, where the reference template processing parameter is a parameter contained in the decoding parameter and used to construct the matching template. A matching block of the current block is determined according to the matching template. A prediction value of the current block is determined according to the matching block.

18 Claims, 7 Drawing Sheets

(51) Int. Cl.
  *H04N 19/159*  (2014.01)
  *H04N 19/176*  (2014.01)
(58) Field of Classification Search
  CPC .... H04N 19/11; H04N 19/147; H04N 19/593; H04N 19/117
  See application file for complete search history.

(56) References Cited

U.S. PATENT DOCUMENTS

| | | | |
|---|---|---|---|
| 2017/0339404 A1 | 11/2017 | Panusopone et al. | |
| 2018/0332279 A1 | 11/2018 | Kang et al. | |
| 2022/0046236 A1* | 2/2022 | Li | H04N 19/176 |

FOREIGN PATENT DOCUMENTS

| | | |
|---|---|---|
| CN | 105338351 | 2/2016 |
| CN | 106464870 | 2/2017 |
| JP | 2018509005 | 3/2018 |
| WO | 2019141907 A1 | 7/2019 |

OTHER PUBLICATIONS

IPI, Office Action for IN Application No. 202217023457, Sep. 7, 2022.
EPO, Extended European Search Report for EP Application No. 19947394.3, Oct. 7, 2022.
JPO, Office Action for JP Application No. 2022-519101, Sep. 29, 2023.
Venugopal et al., "CE8: Intra Region-based Template Matching (Test 8.1)," Joint Video Experts Team (JVET) of ITU-T SG 16 WP 3 and ISO/IEC JTC 1/SC 29/WG 11, JVET-L0077_v2, Oct. 2018.
Zhang et al., "Rotate Intra Block Copy," Joint Video Experts Team (JVET) of ITU-T SG 16 WP 3 and ISO/IEC JTC 1/SC 29/WG 11, JVET-L0041-v1, Oct. 2018.
WIPO, International Search Report and Written Opinion for PCT/CN2019/108598, Jun. 30, 2020.
KIPO, Office Action for KR Application No. 10-2022-7013644, Feb. 26, 2025.

* cited by examiner

PREDICTION VALUE DETERMINATION METHOD AND DECODER

CROSS-REFERENCE TO RELATED APPLICATION(S)

This application is a continuation of International Application No. PCT/CN2019/108598, filed Sep. 27, 2019, the disclosure of which is hereby incorporated by reference in its entirety.

TECHNICAL FIELD

Implementations of the present application relate to the technical field of intra prediction in video coding, and in particular to a prediction value determination method and a decoder.

BACKGROUND

In the existing video coding standards, e.g., H265/266, intra region-based template matching is generally used for intra prediction. In joint video exploration team (JEVT)-L0041, rotate intra block copy is proposed for intra prediction.

For intra region-based template matching used in intra prediction, by traversing templates of all reconstructed blocks, find the minimum value among sums of squared differences between sample values of corresponding positions in the templates of the reconstructed blocks and in a template of a current block, and determine a sample value of a reconstructed block corresponding to a template with the minimum value as a prediction value of the current block.

In addition, compared to intra region-based template matching, rotate intra block copy used in intra prediction is achieved as follows. Rotate the entire block at an arbitrary angle for matching, find the minimum value among sums of squared differences between sample values of vertices of reconstructed picture blocks and sample values of vertices of the current block, and determine a sample value of a reconstructed block corresponding to the minimum value as the prediction value of the current block. Obviously, in intra region-based template matching, the prediction value is selected from the templates of the reconstructed blocks which have been coded, as such, it is difficult to find the most similar reconstructed block. In rotate intra block copy for intra prediction, rotation of the reconstructed block is introduced, which however increases a large amount of computation. It can be seen from this that, the prediction value determined by intra prediction in existing video coding leads to low efficiency of video coding.

SUMMARY

In a first aspect, implementations of the present application provide a prediction value determination method. The method is for a decoder and includes the following.

A bitstream is parsed to obtain a decoding parameter of a current block, where the decoding parameter contains a parameter used in decoding the current block. A first template of the current block is obtained or determined when the decoding parameter indicates that the current block uses a rotate template mode, where the first template contains a neighbouring reconstructed sample of the current block. A reference region of the current block is determined. In the reference region, a matching template of the first template is determined according to a reference template processing parameter, where the reference template processing parameter is a parameter contained in the decoding parameter and used to construct the matching template. A matching block of the current block is determined according to the matching template. A prediction value of the current block is determined according to the matching block.

In a second aspect, implementations of the present application provide a prediction value determination method. The method is for an encoder and includes the following.

Data dependency between a current block and a first template of the current block is obtained, where the first template contains a neighbouring reconstructed sample of the current block. A rotate template mode is used when the data dependency is greater than or equal to a preset threshold. A reference region of the current block is determined in the rotate template mode. In the reference region, a matching template of the first template is determined according to a reference template processing parameter. A matching block of the current block is determined according to the matching template. A prediction value of the current block is determined according to the matching block.

In a third aspect, implementations of the present application provide a decoder. The decoder includes at least one processor and a memory. The memory is coupled to the at least one processor and stores at least one computer executable instruction thereon. The at least one computer executable instruction, when executed by the at least one processor, causes the at least one processor to execute the method of the first aspect.

BRIEF DESCRIPTION OF THE DRAWINGS

FIGS. 2(*a*) and 2(*b*) are schematic diagrams of arrangements of a frame in rotate intra block copy.

DETAILED DESCRIPTION

To better understand features and technical contents of implementations of the present application, the implementations of the present application will be described in detail below with reference to accompanying drawings. The accompanying drawings are merely for reference and description, and are not used to limit the implementations of the present application.

Figure 1:
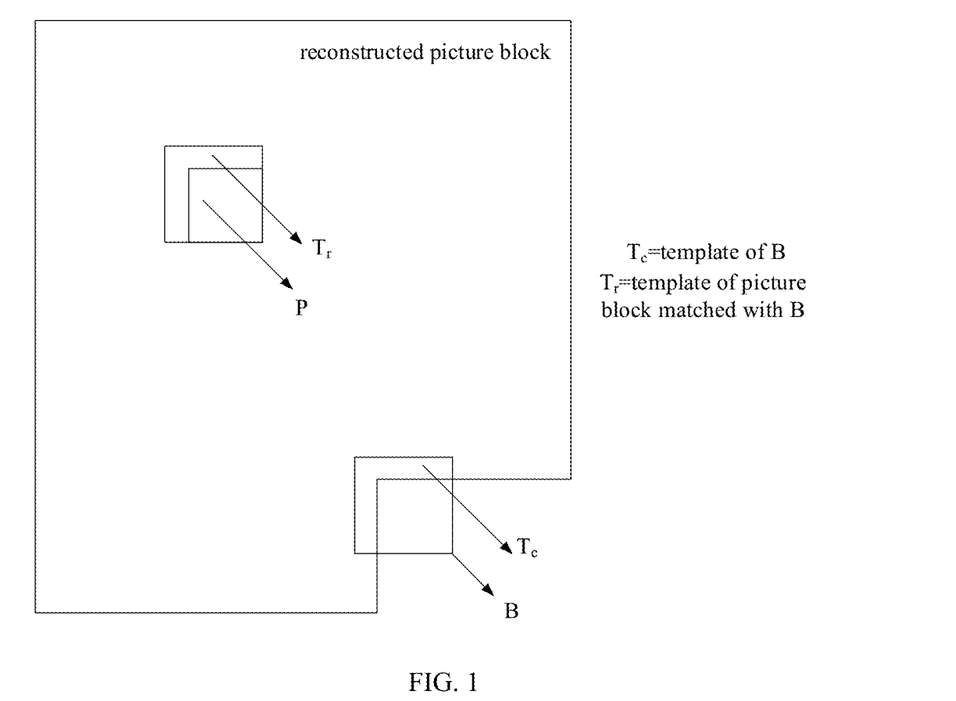
FIG. 1 is a schematic diagram of arrangement of a frame in intra region-based template matching.

In intra prediction, intra region-based template matching is adopted. FIG. 1 is a schematic diagram of arrangement of a frame (or picture) in intra region-based template matching. As illustrated in FIG. 1, for current block B, $T_c$ is a template of B. In encoding B, traverse a template of each reconstructed block, calculate sums of squared differences between sample values of corresponding positions in the template of each reconstructed block and in the template of B, and refer template $T_r$ with the minimum value of the sums of squared differences as a temple of a picture block matched with B, and determine a sample value of reconstructed block P corresponding to $T_r$ as a prediction value of B.

Figure 2A:
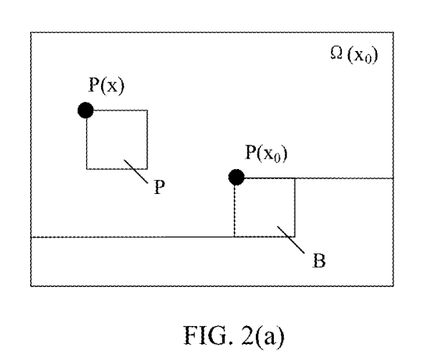
Figure 2B:
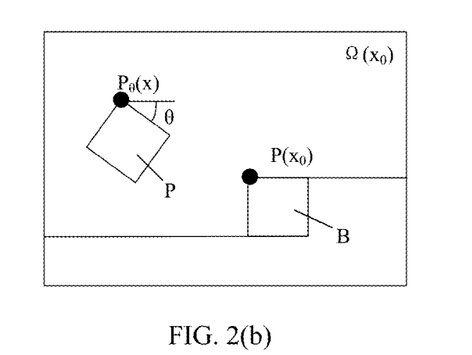

The above method takes into account the template of the reconstructed block, but the number of reconstructed blocks is relatively small, so it is difficult to find a picture block that matches the current block. To overcome the above shortcomings, rotate intra block copy is adopted. FIGS. 2(*a*) and 2(*b*) are schematic diagrams of arrangement of a frame in rotate intra block copy. As illustrated in FIGS. 2(*a*) and 2(*b*), FIG. 2(*a*) is a schematic diagram of arrangement of the reconstructed block and current block before rotation, and FIG. 2(*b*) is a schematic diagram of arrangement of the reconstructed block and current block after rotation. In FIG. 2(*a*) and FIG. 2(*b*), B is the current block, and a vertex coordinate of B is $x_0$. Assuming that P is the finally obtained picture block that matches the current block and a vertex coordinate of P is x, a sample matrix of B is denoted as $P(x_0)$. The encoder uses an already encoded sample matrix $\Omega(x_0)$ (equivalent to a sample matrix of the reconstructed block), to predict $P(x_0)$. The intra block copy is to find in $\Omega(x_0)$ a reconstructed block whose vertex is x, which can result in a minimum sum of squared differences between sample values of samples of P(x) and $P(x_0)$, to find P.

The rotate intra block copy allows the picture block rotate at an arbitrary angle θ. $P_\theta(x)$ represents a sample matrix of a picture block obtained by rotating a picture block whose vertex is x by θ. Find in $\Omega(x_0)$ a picture block whose vertex is x, which can minimize a sum of squared differences between sample values of samples of $P_\theta(x)$ and $P(x_0)$, and determine $P_\theta(x)$ as the prediction value of B.

However, the above rotate intra block copy is for calculation of the entire picture block, which has large calculation complexity and low efficiency of video encoding and decoding. To improve the efficiency of video encoding and decoding, implementations of the present application provide a prediction value determination method.

Figure 3:
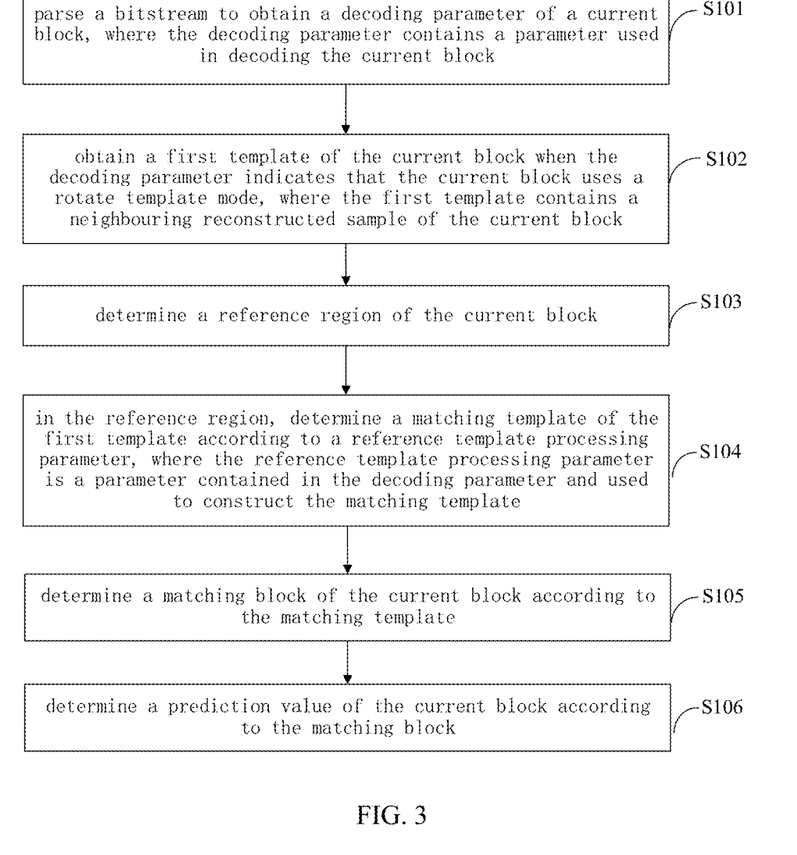
FIG. 3 is an optional schematic flowchart of a prediction value determination method provided by implementations of the present application.

Implementations of the present application provide a prediction value determination method. The method is applied to a decoder. FIG. 3 is an optional schematic flowchart of a prediction value determination method provided by implementations of the present application. As illustrated in FIG. 3, the prediction value determination method includes the following.

S101, a bitstream is parsed to obtain a decoding parameter of a current block, where the decoding parameter contains a parameter used in decoding the current block.

In intra prediction, an encoder signals the decoding parameter used in decoding the current block into the bitstream and transmits the bitstream to the decoder. The decoder parses the bitstream to obtain the decoding parameter of the current block after receiving the bitstream.

S102, a first template of the current block is obtained when the decoding parameter indicates that the current block uses a rotate template mode, where the first template contains a neighbouring reconstructed sample of the current block.

In this implementation, the decoding parameter can be a prediction mode flag used in encoding. For example, when flag (prediction mode flag)=1, it indicates that the rotate template mode is used in encoding. When the decoder determines that the rotate template mode is used, the decoder determines, among neighbouring reconstructed samples of the current block, samples within a preset shape of the first template as samples in the first template, according to the preset shape.

For example, above and left neighbouring reconstructed samples of the current block are determined as the samples in the first template.

S103, a reference region of the current block is determined.

For determining the reference region of the current block, in one possible implementation, the decoder determines all or part of samples which have been reconstructed (in other words, all or part of already-reconstructed samples) before decoding of the current block and contained in a picture where the current block is located as the reference region. In another possible implementation, the decoder determines all or part of samples which have been reconstructed (in other words, all or part of already-reconstructed samples) in pictures other than the picture where the current block is located as the reference region.

To keep the obtained candidate template in the reference region, in an optional implementation, the decoder obtains a rotation angle, rotates the candidate template around the vertex of the candidate template according to the rotation angle, intercepts (or excludes) the part of the rotated reconstructed block beyond the reference region, determines the reconstructed block obtained after interception as a rotatable reconstructed block, obtains a sample matrix of the rotatable reconstructed block, and updates the sample matrix of the reconstructed block with the sample matrix of the rotatable reconstructed block.

Figure 4:
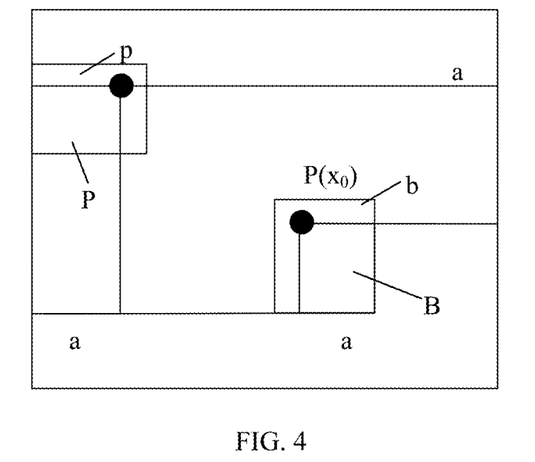
FIG. 4 is an optional schematic diagram of arrangement of rotating an intra template provided by implementations of the present application.

FIG. 4 is an optional schematic diagram of arrangement of rotating an intra template provided by implementations of the present application. As illustrated in FIG. 4, B is the current block, b is the template of B, and the sample matrix of the picture block corresponding to the vertex coordinate $x_0$ of B is $P(x_0)$. For example, for the reconstructed block P in FIG. 4, after rotation, the rotated reconstructed block P and template p of P just does not exceed the reference region. The upper and left rows of P, if rotated, will exceed the reference region. Therefore, for the reconstructed block, a reconstructed block region with a height of a is intercepted from the upper border down and a reconstructed block region with a height of a is intercepted from the left border to the right. The remaining region after interception is determined as a rotatable reconstructed block, and the reconstructed block is updated with the rotatable reconstructed block.

S104, in the reference region, a matching template of the first template is determined according to a reference template processing parameter, where the reference template processing parameter is a parameter contained in the decoding parameter and used to construct the matching template.

To find the matching block that best matches the current block, herein, the reference template processing parameter is used to process the sample matrix of the candidate template corresponding to the first template, and the processed matching template can be obtained. When there are multiple reference template processing parameters, multiple matching templates can be obtained. In this way, multiple matching templates can be obtained for comparison with the first template of the current block.

The reference template processing parameter can indicate the rotation angle of the template, such as a clockwise rotation angle or a counterclockwise rotation angle. The specific selection is made according to the actual situation, which is not specifically limited in this implementation.

In addition, the reference template processing parameter may also be a movement parameter, where the movement parameter may include a movement distance and a movement direction. The decoder moves the candidate template according to the moving distance and moving direction, and obtains the matching template. For example, the decoder translates the candidate template up or down, and the like. The specific selection is made according to the actual situation, which is not specifically limited in this implementation.

Figure 5:
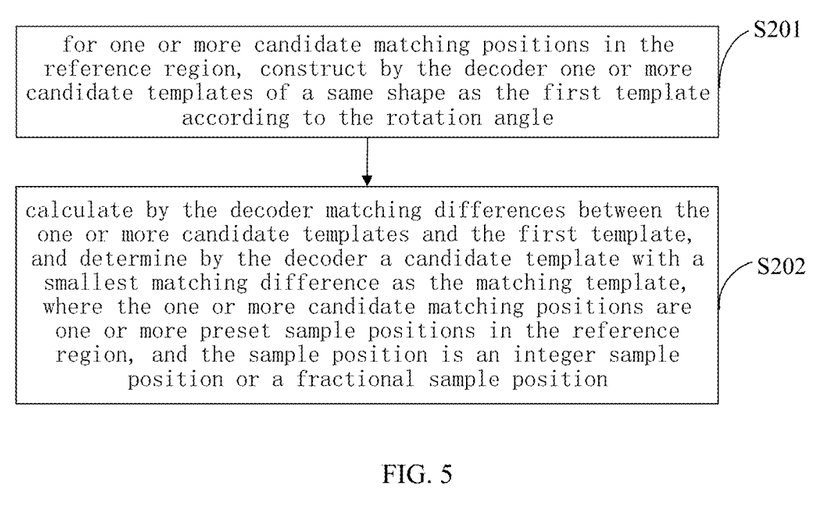
FIG. 5 is another optional schematic flowchart of a prediction value determination method provided by implementations of the present application.

In this implementation, when the reference template processing parameter is the rotation angle, in an optional implementation, FIG. 5 is another optional schematic flowchart of a prediction value determination method provided by implementations of the present application. As illustrated in FIG. 5, the decoder determines in the reference region the matching template of the first template according to the reference template processing parameter as follows.

S201, for one or more candidate matching positions in the reference region, the decoder constructs one or more candidate templates of a same shape as the first template according to the rotation angle.

In this implementation, the reference template processing parameter contains an initial angle value and an interval step-size value. The decoder determines a sum of an initial value equal to the initial angle value and an interval angle represented by the interval step-size value as the rotation angle.

Furthermore, the rotation angle is less than 360 degrees.

For example, in the case that the initial angle value is 30 degrees and the interval step-size value is 30 degrees, the rotation angle can include: 30 degrees, 60 degrees, 90 degrees, 120 degrees, 150 degrees, 180 degrees, 210 degrees, 240 degrees, 270 degrees, 300, degrees, and 330 degrees.

Specifically, the decoder determines samples within a shape as the candidate template after the shape is rotated around a candidate matching point by the rotation angle with the candidate matching position as a vertex, where the shape is of a same size as the first template.

The decoder obtains a sample value in the candidate template by filtering one or more reconstructed samples in the reference region with a preset first filter according to the rotation angle, where the first filter is a low pass filter or an interpolation filter. The specific selection is made according to the actual situation, which is not specifically limited in this implementation.

After the matching template is obtained, the decoder calculates the candidate template with interpolation according to a sample value of each sample in the candidate template, the rotation angle, and a distance between two neighbouring samples.

Figure 6:
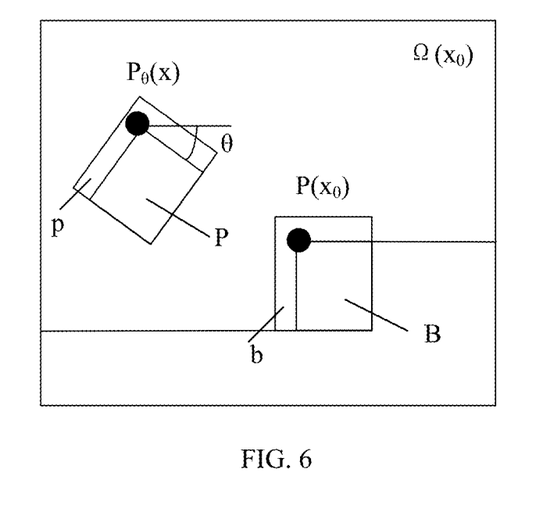
FIG. 6 is another optional schematic diagram of arrangement of rotating an intra template provided by implementations of the present application.
Figure 7:
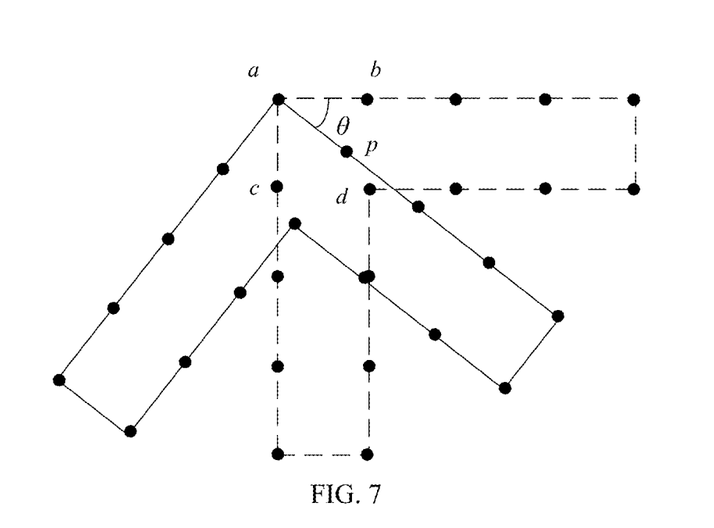
FIG. 7 is an optional schematic structural diagram of rotating samples of an intra template provided by implementations of the present application.

For example, FIG. 6 is another optional schematic diagram of arrangement of rotating an intra template provided by implementations of the present application. As illustrated in FIG. 6, B is the current block, and the vertex coordinate of B is $x_0$. If P is the picture block that matches the current block and the vertex coordinate of P is x, the sample matrix of B is denoted as $P(x_0)$. The encoder uses an already encoded sample matrix $\Omega(x_0)$, to predict $P(x_0)$. Before prediction, the template p of P is rotated around the vertex of P according to a preset rotation angle θ, to obtain the rotated template p of P as illustrated in FIG. 7. To find in $\Omega(x_0)$ a candidate template that matches the template of the picture block whose vertex is x, that is, p in FIG. 7, it is necessary to minimize the sum of squared differences between sample values of samples of p(x) and $b(x_0)$, so that P can be found.

Figure 8:
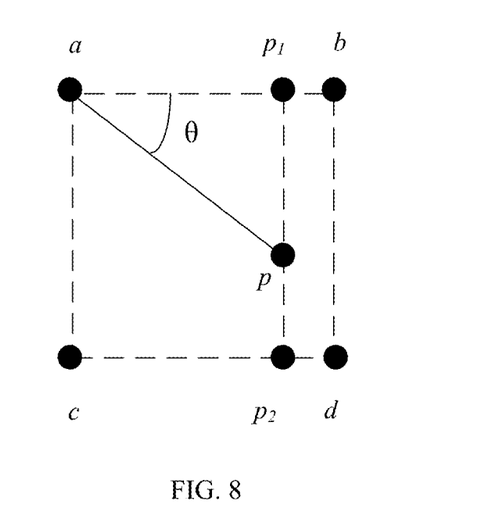
FIG. 8 is a schematic structural diagram of rotating some samples of the intra template in FIG. 7 provided by implementations of the present application.

Before the sum of squared differences between the sample values of the samples of p(x) and $b(x_0)$ is calculated, p(x) needs to be determined first. To determine p(x), FIG. 7 is an optional schematic structural diagram of rotating samples of an intra template provided by implementations of the present application. As illustrated in FIG. 7, the dotted line denotes the template p before rotation and the solid line denotes the template p after rotation. On the template p before rotation, the sample value f(a) of point a, the sample value f(b) of point b, the sample value f(c) of point c, and the sample value f(d) of point d are obtained, and the distance x between two neighbouring sample values are obtained. The sample value of point p (rotated point b) is calculated using bilinear interpolation. FIG. 8 is a schematic structural diagram of rotating some samples of the intra template in FIG. 7 provided by implementations of the present application. As illustrated in FIG. 8, the formula for calculating the sample value of point p is as follows.

The formula for calculating the sample value of point $p_1$ (illustrated in FIG. 8) is as follows.

$$f(p_1) = \frac{x - x \cdot \cos\theta}{x} \cdot f(c) + \frac{x \cdot \cos\theta}{x} \cdot f(b) \quad (1)$$

The formula for calculating the sample value of point $p_2$ (illustrated in FIG. 8) is as follows.

$$f(p_2) = \frac{x - x \cdot \cos\theta}{x} \cdot f(a) + \frac{x \cdot \cos\theta}{x} \cdot f(d) \quad (2)$$

The formula for calculating the sample value of point p is as follows.

$$f(p) = \frac{x \cdot \sin\theta}{x} \cdot f(p_1) + \frac{x - x \cdot \sin\theta}{x} \cdot f(p_2) \quad (3)$$

In a similar way, the sample matrix of the candidate template with the rotation angle of θ can be finally obtained.

S202, the decoder calculates matching differences between the one or more candidate templates and the first template, and determines a candidate template with a smallest matching difference as the matching template, where the one or more candidate matching positions are one or more preset sample positions in the reference region, and the sample position is an integer sample position or a fractional sample position.

Specifically, the decoder calculates the matching differences between the one or more candidate templates and the first template according to a matching difference criterion, where the matching difference criterion includes at least one of: a sum of squared differences, a mean squared difference, a sum of absolute differences, a mean absolute difference, and a structural similarity. The specific selection is made according to the actual situation, which is not specifically limited in this implementation.

Take the processing parameter as the clockwise rotation angle as an example for illustration. In practical applications, the decoder determines the candidate template corresponding to the first template, and rotates the candidate template according to the preset rotation angle in the reference region. Herein, compared to the rotation of the picture block, rotation of the template is performed. Since the number of samples in the template is less than that in the picture block, rotating the template can reduce the calculation amount of sample values of samples in the template after rotation.

S105, a matching block of the current block is determined according to the matching template.

In this implementation, the decoder determines the matching block of the current block according to the matching template as follows. The decoder determines matching samples contained in a region located in a position indicated by the matching template and of a same size as the current block as samples in the matching block, where a relative position between the matching template and the matching block is a same as a relative position between the current block and the first template.

In this implementation, the decoder obtains a sample value in the matching block by filtering one or more samples in the reference region with a preset second filter. The second filter is a low pass filter or an interpolation filter. The specific selection is made according to the actual situation, which is not specifically limited in this implementation.

S106, a prediction value of the current block is determined according to the matching block.

In this implementation, the decoder determines the matching block as the prediction value of the current block. Alternatively, the decoder obtains the prediction value of the current block by weighting sample values in the matching block with a linear model, where a parameter of the linear model is one of: a preset parameter, a parameter derived according to a preset rule, and a parameter of the linear model contained in the decoding parameter. The specific selection is made according to the actual situation, which is not specifically limited in this implementation.

Furthermore, after determining the prediction value of the current block according to the matching block, the decoder parses the bitstream to obtain a prediction residual of the current block, and obtains a reconstructed value of a sample in the current block according to the prediction value and the prediction residual of the current block.

Herein, it should be noted that, the sample matrix provided by the present application may be a sample matrix of chroma values or may be a sample matrix of luma values, which is not specifically limited in the implementations of the present application.

It can be understood that, the rotate template mode is obtained from the bitstream, and in the rotate template mode, the first template of the current block is obtained and the reference region of the current block is determined, and in the reference region, according to the reference template processing parameter, the matching template of the first template is determined, then, the matching block matched with the current block is determined according to the matching template, and then the prediction value of the current block is determined. In this way, more templates can be obtained by processing the template of the picture block, and more templates can be used to compare with the template of the current block, so that the matching block that best matches the current block can be found, which is beneficial to more accurately determine the matching block that best matches the current block, and then the prediction value of the current block can be determined. By adopting the calculation manner of rotating the template, calculation amount in encoding and decoding can be reduced, thereby improving encoding and decoding efficiency.

Figure 9:
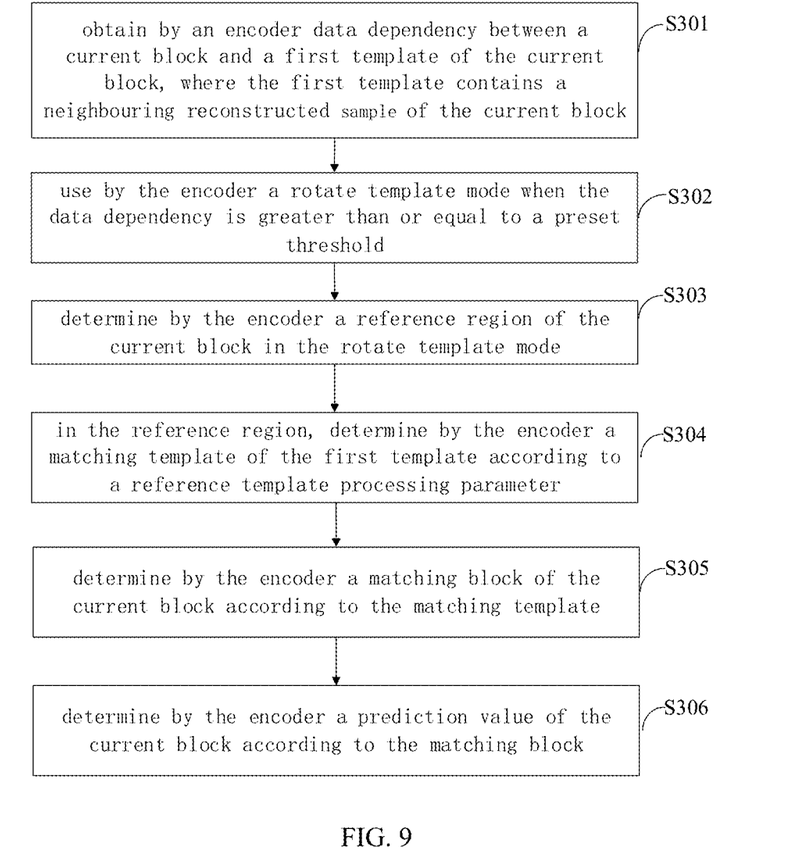
FIG. 9 is still another optional schematic flowchart of a prediction value determination method provided by implementations of the present application.

Implementations of the present application further provide a prediction value determination method. The method is applied to an encoder. FIG. 9 is an optional schematic flowchart of a prediction value determination method provided by implementations of the present application. As illustrated in FIG. 9, the prediction value determination method includes the following.

S301, the encoder obtains data dependency between a current block and a first template of the current block, where the first template contains a neighbouring reconstructed sample of the current block.

The encoder obtains the neighbouring reconstructed samples of the current block, and determines the neighbouring reconstructed samples of the current block as the first template of the current block. After that, the encoder obtains the data dependency between the current block and the first template of the current block.

Figure 10:
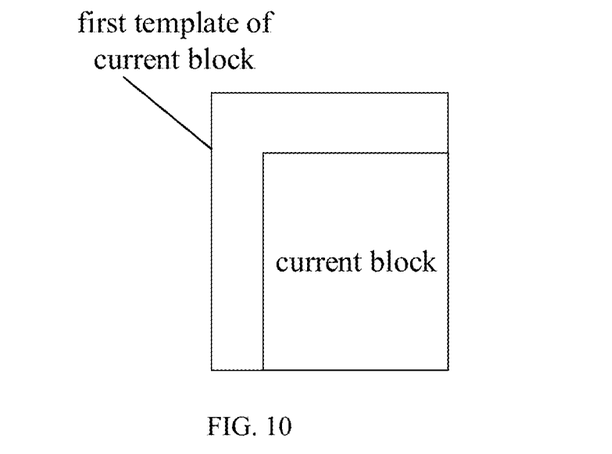
FIG. 10 is an optional schematic diagram of a structure between a current block and a first template of the current block provided by implementations of the present application.

Exemplarily, as illustrated in FIG. 10, it is a schematic diagram of a structure between the current block and the first template of the current block. The encoder obtains the data dependency between the current block and the first template of the current block.

S302, the encoder uses a rotate template mode when the data dependency is greater than or equal to a preset threshold.

The preset threshold is preset in the encoder. After obtaining the data dependency between the current block and the first template of the current block, the encoder compares the data dependency with the preset threshold. When the encoder determines that the data dependency is greater than or equal to the preset threshold, the encoder uses the rotate template mode. Furthermore, when the encoder determines that the data dependency is less than the preset threshold, the encoder uses a traditional angle prediction mode.

S303, the encoder determines a reference region of the current block in the rotate template mode.

It should be noted that, the process of S303 performed by the encoder is the same as that of S103 performed by the decoder, which is not repeated herein.

S304, in the reference region, the encoder determines a matching template of the first template according to a reference template processing parameter.

It should be noted that, the process of S304 performed by the encoder is the same as that of S104 performed by the decoder, which is not repeated herein.

S305, the encoder determines a matching block of the current block according to the matching template.

It should be noted that, the process of S305 performed by the encoder is the same as that of S105 performed by the decoder, which is not repeated herein.

S306, the encoder determines a prediction value of the current block according to the matching block.

It should be noted that, the process of S306 performed by the encoder is the same as that of S106 performed by the decoder, which is not repeated herein.

Furthermore, after determining the prediction value of the current block, the encoder determines a prediction residual of the current block according to the prediction value of the current block and an acquired sample value corresponding to an original picture and signals the prediction residual of the current block and a decoding parameter indicating using the rotate template mode into a bitstream. As such, the decoder can use the prediction value determination method the same as that used by the encoder provided in the implementations of the present application to determine the prediction value of the current block.

It can be understood that, the encoder determines the data dependency between the current block and the first template of the current block, and uses the rotate template mode only when the data dependency is greater than or equal to the preset threshold. When the data dependency between the current block and the first template of the current block is low, the matching block corresponding to the matched matching template is generally less similar to the current block, and in this case, the rotate template mode is unavailable in this case. The rotate template mode is used only when the data dependency between the current block and the first template of the current block is high, which can reduce search time and improve search efficiency.

The following example is used to describe the prediction value determination method of the above one or more implementations.

Figure 11:
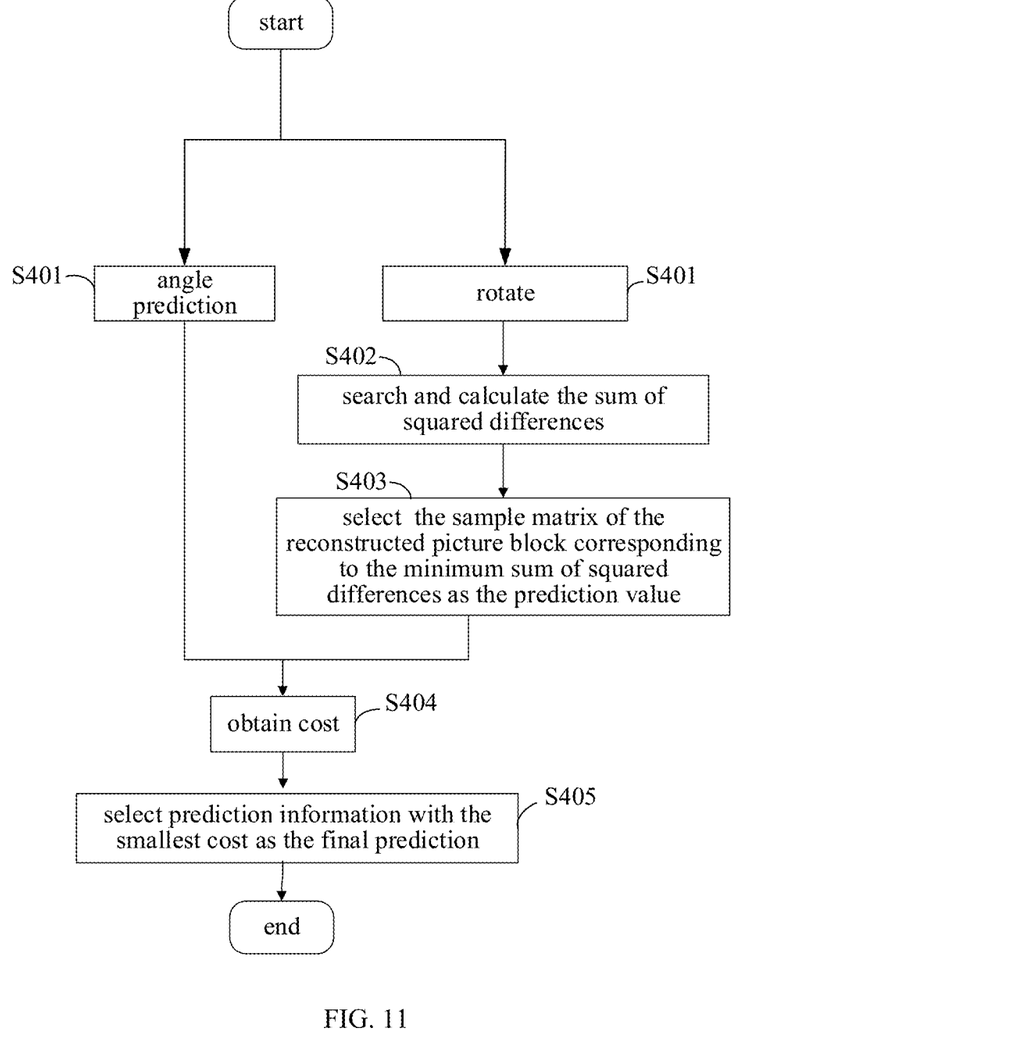
FIG. 11 is an optional schematic flowchart of an example of a prediction value determination method provided by implementations of the present application.

FIG. 11 is an optional schematic flowchart of an example of a prediction value determination method provided by implementations of the present application. As illustrated in FIG. 11, the prediction value determination method can include the following.

S401, an encoder uses a method of intra rotate template matching to rotate a template of a reconstructed block; the encoder further uses a method of intra angle prediction.

S402, after the encoder rotates the template of the reconstructed block, the encoder traverses, within a search range, templates of all reconstructed blocks (obtained from the reconstructed block) with the same size as the current block, calculates the sum of squared differences between each rotated template and the template of the current block, and rotates the template with an initial value of 30 degrees, a step-size of 30 degrees, and a rotation angle being less than an angle value of 360 degrees to obtain the rotated template, and calculates the sum of squared differences between the template corresponding to each rotation angle and the template of the current block.

S403, the encoder selects a template corresponding to the minimum value among the sums of squared differences, and uses the sample value of the reconstructed block to which this template belongs as a prediction value of the current block.

S404, the encoder obtains a prediction residual according to the obtained prediction value, and obtains cost1 using the method of intra rotation template matching according to quantization, change, and entropy encoding; the encoder also obtains cost2 using angle prediction.

S405, the encoder compares cost1 and cost2, if cost1 is smaller, the encoder will save prediction information obtained by rotate template matching, and if cost2 is smaller, the encoder will save prediction information obtained by traditional angle prediction.

Figure 12:
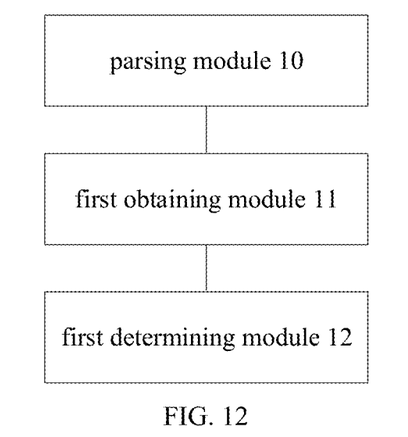
FIG. 12 is schematic structural diagram 1 of a decoder provided by implementations of the present application.

Based on the same inventive concept of the previous implementations, referring to FIG. 12, FIG. 12 is schematic structural diagram 1 of a decoder 1 provided by implementations of the present application. The decoder 1 includes a parsing module 10, a first obtaining module 11, and a first determining module 12.

The parsing module 10 is configured to parse a bitstream to obtain a decoding parameter of a current block, where the decoding parameter contains a parameter used in decoding the current block.

The first obtaining module 11 is configured to obtain a first template of the current block when the decoding parameter indicates that the current block uses a rotate template mode, where the first template contains a neighbouring reconstructed sample of the current block.

The first determining module 12 is configured to: determine a reference region of the current block; determine in the reference region a matching template of the first template according to a reference template processing parameter, where the reference template processing parameter is a parameter contained in the decoding parameter and used to construct the matching template; determine a matching block of the current block according to the matching template; and determine a prediction value of the current block according to the matching block.

In the above solution, the first obtaining module 11 is specifically configured to determine, among neighbouring reconstructed samples of the current block, samples within a preset shape of the first template as samples in the first template, according to the preset shape.

In the above solution, the first determining module 12 is specifically configured to determine all or part of samples which have been reconstructed before decoding of the current block and contained in a picture where the current block is located as the reference region.

In the above solution, the first determining module 12 is specifically configured to determine all or part of samples which have been reconstructed in pictures other than a picture where the current block is located as the reference region.

In the above solution, the reference template processing parameter indicates a rotation angle of a template.

In the above solution, the first determining module further includes a first constructing sub-module and a first calculating sub-module.

The first constructing sub-module is configured to, for one or more candidate matching positions in the reference region, construct one or more candidate templates of a same shape as the first template according to the rotation angle.

The first calculating sub-module is configured to calculate a matching difference between each of the one or more candidate templates and the first template to obtain multiple matching differences, and determine from the multiple matching differences a candidate template with a smallest matching difference as the matching template.

In the above solution, the one or more candidate matching positions are one or more preset sample positions in the reference region, where the sample position is an integer sample position or a fractional sample position.

In the above solution, the first constructing sub-module is specifically configured to: determine samples within a shape as the candidate template after the shape is rotated around a candidate matching point by the rotation angle with the candidate matching position as a vertex, where the shape is of a same size as the first template.

In the above solution, the first determining module 12 further includes a first filtering sub-module.

The first filtering sub-module is configured to obtain a sample value in the candidate template by filtering one or more reconstructed samples in the reference region with a preset first filter according to the rotation angle.

In the above solution, the first determining module 12 is further configured to determine matching samples contained in a region located in a position indicated by the matching template and of a same size as the current block as samples in the matching block, where a relative position between the matching template and the matching block is a same as a relative position between the current block and the first template.

In the above solution, the first filtering sub-module is further configured to obtain a sample value in the matching block by filtering one or more samples in the reference region with a preset second filter.

In the above solution, the first filter is a low pass filter or an interpolation filter.

In the above solution, the second filter is a low pass filter or an interpolation filter.

In the above solution, the reference template processing parameter contains an initial angle value and an interval step-size value; and the rotation angle is a sum of an initial value equal to the initial angle value and an interval angle represented by the interval step-size value.

In the above solution, the rotation angle is less than 360 degrees.

In the above solution, the first calculating sub-module is further configured to calculate the matching differences between the one or more candidate templates and the first template according to a matching difference criterion.

In the above solution, the matching difference criterion includes at least one of: a sum of squared differences, a mean squared difference, a sum of absolute differences, a mean absolute difference, and a structural similarity.

In the above solution, the first determining module 12 is further configured to: determine the matching block as the prediction value of the current block; or obtain the prediction value of the current block by weighting sample values in the matching block with a linear model, where a parameter of the linear model is one of: a preset parameter, a parameter derived according to a preset rule, and a parameter of the linear model contained in the decoding parameter.

In the above solution, the parsing module 10 is further configured to parse the bitstream to obtain a prediction residual of the current block.

The first determining module 12 is further configured to obtain a reconstructed value of a sample in the current block according to the prediction value and the prediction residual of the current block.

It can be understood that, in this implementation, a "unit" may be a part of a circuit, a part of a processor, a part of a program, or software, etc., which can be a module or not.

In addition, in this implementation, the various components may be integrated into one processing unit, or each unit may be physically present, or two or more units may be integrated into one unit. The above-mentioned integrated unit can be implemented in the form of hardware or a software function unit.

The integrated unit may be stored in a computer readable storage medium if implemented in the form of a software functional unit and is sold or used as a separate product. Based on such understanding, the technical solutions in essential or the part of the technical solutions that contributes to the prior art of this implementation, or all or part of the technical solutions, may be embodied in the form of a software product. The computer software product is stored in a storage medium and includes instructions for causing a computer device (which may be a personal computer, a server, or a network device and the like) or a processor to perform all or part of the steps described in this implementation. The above storage medium includes various medium capable of storing program codes, such as a universal serial bus (USB) flash disk, a removable hard disk, a read-only memory (ROM), a random access memory (RAM), a magnetic disk, compact disc, or the like.

Figure 13:
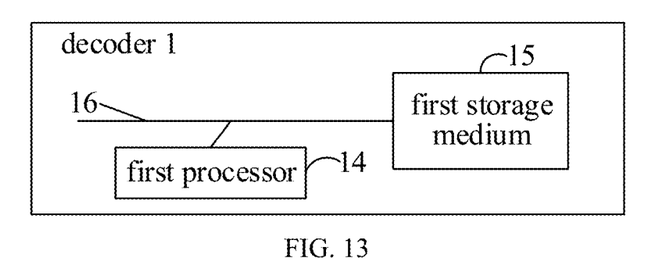
FIG. 13 is schematic structural diagram 2 of a decoder provided by implementations of the present application.

FIG. 13 is schematic structural diagram 2 of a decoder provided by implementations of the present application. As illustrated in FIG. 13, the implementations of the present application provide a decoder 1.

The decoder 1 includes at least one processor (e.g., a first processor 14) and a memory (e.g., a first storage medium 15) storing at least one computer executable instruction (e.g., instructions) executable by the first processor 14. The first storage medium 15 relies on the first processor 14 to execute operations via a first communication bus 16. When executed by the first processor 14, the instructions execute the prediction value determination method corresponding to the above decoder.

It should be noted that, in practical application, various components in the terminal are coupled together through the first communication bus 16. It can be understood that, the first communication bus 16 is used to realize connection and communication among these components. In addition to the data bus, the first communication bus 16 also includes a power bus, a control bus, and a status signal bus. However, for clarity, various buses are labeled as communication bus 16 in FIG. 13.

Implementations of the present application provide a first computer storage medium. The first computer storage medium stores executable instructions. When the executable instructions are executed by one or more processors, the first processor performs the prediction value determination method corresponding to the decoder of the above one or more implementations.

Figure 14:
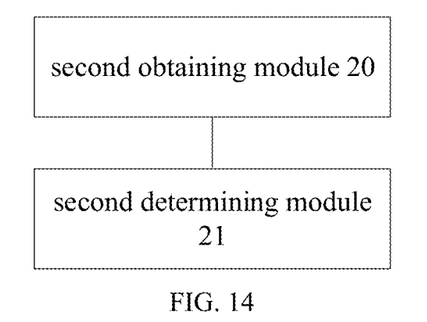
FIG. 14 is schematic structural diagram 1 of an encoder provided by implementations of the present application.

Based on the same inventive concept of the previous implementations, referring to FIG. 14, FIG. 14 is schematic structural diagram 1 of an encoder 2 provided by implementations of the present application. The encoder 2 includes a second obtaining module 20 and a second determining module 21.

The second obtaining module 20 is configured to obtain data dependency between a current block and a first template of the current block, where the first template contains a neighbouring reconstructed sample of the current block.

The second determining module 21 is configured to: use a rotate template mode when the data dependency is greater than or equal to a preset threshold; determine in the rotate template mode a reference region of the current block; determine in the reference region a matching template of the first template according to a reference template processing parameter; determine a matching block of the current block according to the matching template; and determine a prediction value of the current block according to the matching block.

In the above solution, the second obtaining module 20 is specifically configured to: determine, among neighbouring reconstructed samples of the current block, samples within a preset shape of the first template as samples in the first template, according to the preset shape.

In the above solution, the second determining module 21 is specifically configured to determine all or part of samples which have been reconstructed before decoding of the current block and contained in a picture where the current block is located as the reference region.

In the above solution, the second determining module 21 is specifically configured to determine all or part of samples which have been reconstructed in pictures other than a picture where the current block is located as the reference region.

In the above solution, the reference template processing parameter indicates a rotation angle of a template.

In the above solution, the second determining module further includes a second constructing sub-module and a second calculating sub-module.

The second constructing sub-module is configured, for one or more candidate matching positions in the reference region, construct one or more candidate templates of a same shape as the first template according to the rotation angle.

The second calculating sub-module is configured to calculate matching differences between the one or more candidate templates and the first template, and determine a candidate template with a smallest matching difference as the matching template.

In the above solution, the one or more candidate matching positions are one or more preset sample positions in the reference region, where the sample position is an integer sample position or a fractional sample position.

In the above solution, the second constructing sub-module is specifically configured to: determine samples within a shape as the candidate template after the shape is rotated around a candidate matching point by the rotation angle with the candidate matching position as a vertex, where the shape is of a same size as the first template.

In the above solution, the second determining module 21 further includes a second filtering sub-module.

The second filtering sub-module is configured to obtain a sample value in the candidate template by filtering one or more reconstructed samples in the reference region with a preset first filter according to the rotation angle.

In the above solution, the second determining module 21 is further configured to determine matching samples contained in a region located in a position indicated by the matching template and of a same size as the current block as samples in the matching block, where a relative position between the matching template and the matching block is a same as a relative position between the current block and the first template.

In the above solution, the second filtering sub-module is further configured to obtain a sample value in the matching block by filtering one or more samples in the reference region with a preset second filter.

In the above solution, the first filter is a low pass filter or an interpolation filter.

In the above solution, the second filter is a low pass filter or an interpolation filter.

In the above solution, the reference template processing parameter contains an initial angle value and an interval step-size value; and the rotation angle is a sum of an initial value equal to the initial angle value and an interval angle represented by the interval step-size value.

In the above solution, the rotation angle is less than 360 degrees.

In the above solution, the second calculating sub-module is further configured to calculate the matching differences between the one or more candidate templates and the first template according to a matching difference criterion.

In the above solution, the matching difference criterion includes at least one of: a sum of squared differences, a mean squared difference, a sum of absolute differences, a mean absolute difference, and a structural similarity.

In the above solution, the second determining module 21 is further configured to: determine the matching block as the prediction value of the current block; or obtain the prediction value of the current block by weighting sample values in the matching block with a linear model, where a parameter of the linear model is one of: a preset parameter, a parameter derived according to a preset rule, and a parameter of the linear model contained in the decoding parameter.

In the above solution, the encoder 2 further includes a signalling module.

The signalling module is configured to signal a prediction residual of the current block and a decoding parameter indicating using the rotate template mode into a bitstream, where the prediction residual is determined according to the prediction value of the current block and an acquired sample value corresponding to an original picture.

It can be understood that, in this implementation, a "unit" may be a part of a circuit, a part of a processor, a part of a program, or software, etc., which can be a module or not.

In addition, in this implementation, the various components may be integrated into one processing unit, or each unit may be physically present, or two or more units may be integrated into one unit. The above-mentioned integrated unit can be implemented in the form of hardware or a software function unit.

The integrated unit may be stored in a computer readable storage medium if implemented in the form of a software functional unit and is sold or used as a separate product. Based on such understanding, the technical solutions in essential or the part of the technical solutions that contributes to the prior art of this implementation, or all or part of the technical solutions, may be embodied in the form of a software product. The computer software product is stored in a storage medium and includes instructions for causing a computer device (which may be a personal computer, a server, or a network device and the like) or a processor to perform all or part of the steps described in this implementation. The above storage medium includes various medium capable of storing program codes, such as a universal serial bus (USB) flash disk, a removable hard disk, a read-only memory (ROM), a random access memory (RAM), a magnetic disk, compact disc, or the like.

Figure 15:
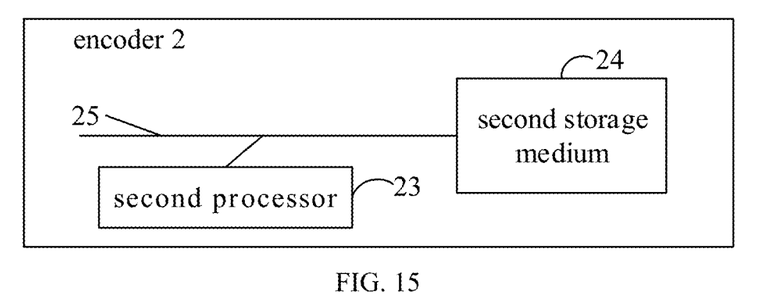
FIG. 15 is schematic structural diagram 2 of an encoder provided by implementations of the present application.

FIG. 15 is schematic structural diagram 2 of an encoder provided by implementations of the present application. As illustrated in FIG. 15, the implementations of the present application provide an encoder 2.

The encoder 2 includes a second processor 23 and a second storage medium 24 storing instructions executable by the second processor 23. The second storage medium 24 relies on the second processor 23 to execute operations via a second communication bus 25. When executed by the second processor 23, the instructions execute the prediction value determination method corresponding to the above encoder.

It should be noted that, in practical application, various components in the terminal are coupled together through the second communication bus 25. It can be understood that, the second communication bus 25 is used to realize connection and communication among these components. In addition to the data bus, the second communication bus 25 also includes a power bus, a control bus, and a status signal bus. However, for clarity, various buses are labeled as communication bus 25 in FIG. 15.

Implementations of the present application provide a second computer storage medium. The second computer storage medium stores executable instructions. When the executable instructions are executed by one or more processors, the second processor performs the prediction value determination method corresponding to the encoder of the above one or more implementations.

It can be understood that, the memory according to implementations of the present application may be a volatile memory or a non-volatile memory, or may include both the volatile memory and the non-volatile memory. The non-volatile memory may be a ROM, a programmable read only memory (programmable ROM, PROM), an erasable programmable read only memory (erasable PROM, EPROM), an electrically erasable programmable read only memory (electrically EPROM, EEPROM), or flash memory. The volatile memory can be a RAM that acts as an external cache. By way of example but not limitation, many forms of RAM are available, such as a static random access memory (static RAM, SRAM), a dynamic random access memory (dynamic RAM, DRAM), a synchronous dynamic random access memory (synchronous DRAM, SDRAM), a double data rate SDRAM (DDRSDRAM), an enhanced synchronous dynamic random access memory (ESDRAM), a synchronous link dynamic random access memory (synch-link DRAM, SLDRAM), and a direct Rambus random access memory (direct Rambus RAM, DRRAM). The memory of the systems and methods described herein is intended to include, but is not limited to, these and any other suitable types of memory.

The processor in the implementation of the present application may be an integrated circuit chip and has a signal processing capability. In the implementation process, each step of the foregoing method implementation may be completed by using an integrated logic circuit of hardware in the processor or an instruction in a form of software. The above processor may be a general-purpose processor, a digital signal processor (DSP), an application specific integrated circuit (ASIC), a field programmable gate array (FPGA), or other programming logic devices, discrete gate or transistor logic devices, discrete hardware components. Various methods, steps, and logical block diagrams disclosed in the implementations of the present application can be implemented or executed. The general-purpose processor may be a microprocessor or the processor may be any conventional processor or the like. The steps of the method disclosed in combination with the implementations of the present application may be directly implemented by a hardware decoding processor, or may be performed by using a combination of hardware and software modules in the decoding processor. The software module may be located in a mature storage medium such as a random access memory, a flash memory, a read-only memory, a programmable read-only memory, or an electrically erasable programmable memory, a register, and the like. The storage medium is located in the memory, and the processor reads the information in the memory and completes the steps of the foregoing method in combination with its hardware.

It can be understood that, these implementations described in the present application may be implemented by hardware, software, firmware, middleware, a microcode or a combination thereof. In case of implementation with the hardware, the processing unit may be implemented in one or more ASICs, DSPs, DSP devices (DSPDs), PLDs, FPGAs, general-purpose processors, controllers, microcontrollers, microprocessors, other electronic units configured to execute the functions in the present application or combinations thereof.

In case of implementation with the software, the technology of the present application may be implemented through the modules (for example, processes and functions) executing the functions in the present application. A software code may be stored in the memory and executed by the processor. The memory may be implemented inside the processor or outside the processor.

It is noted that in the present application, the terms "including", "containing" or any other variations thereof are intended to cover non-exclusive inclusion. As a result, a process, method, article, or device that includes a series of elements includes not only those elements, but also other elements that are not explicitly listed, or further includes elements inherent to the process, method, article, or device. If there are no more restrictions, the element defined by the sentence "including one . . . " does not exclude the existence of other same elements in the process, method, article, or device that includes the element.

The serial numbers of the foregoing implementations of the present application are merely for description, and do not represent the superiority of the implementations of the present application.

From the description of the above implementations, those skilled in the art can clearly understand that the method of the above implementations can be implemented by means of software and a necessary general hardware platform, and of course can also be implemented by hardware. However, in many cases, the former is the better implementation manner. Based on such understanding, the technical solutions in essential or the part that contributes to the prior art of the present application may be embodied as software products. The computer software product is stored in a storage medium (such as ROM/RAM, magnetic disk, CD-ROM) and includes several instructions to cause a terminal (which may be a mobile phone, a computer, a server, or a network device, etc.) to execute the methods described in various implementations of the present application.

The implementations of the present application are described above with reference to the accompanying drawings, but the present application is not limited to the above detailed description. The above detailed description is merely for illustration rather than for restriction. Under the inspiration of the present application, those skilled in the art can make changes without departing from the spirit of the present application and the scope protected by the claims. These all fall within the protection of the present application.

INDUSTRIAL APPLICABILITY

In the implementations of the present application, the bitstream is parsed to obtain the decoding parameter of the current block, where the decoding parameter contains the parameter used in decoding the current block. The first template of the current block is obtained when the decoding parameter indicates that the current block uses the rotate template mode, where the first template contains the neighbouring reconstructed sample of the current block. The reference region of the current block is determined. In the reference region, the matching template of the first template is determined according to the reference template processing parameter, where the reference template processing parameter is the parameter contained in the decoding parameter and used to construct the matching template. The matching block of the current block is determined according to the matching template. The prediction value of the current block is determined according to the matching block. That is, in the implementations of the present application, the rotate template mode is obtained from the bitstream, and in the rotate template mode, the first template of the current block is obtained and the reference region of the current block is determined, and in the reference region, according to the reference template processing parameter, the matching template of the first template is determined, then, the matching block matched with the current block is determined according to the matching template, and then the prediction value of the current block is determined. In this way, more templates can be obtained by processing the template of the picture block, and more templates can be used to compare with the template of the current block, so that the matching block that best matches the current block can be found, which is beneficial to more accurately determine the matching block that best matches the current block, and then the prediction value of the current block can be determined. By adopting the calculation manner of rotating the template, calculation amount in encoding and decoding can be reduced, thereby improving encoding and decoding efficiency.

What is claimed is:

1. A prediction value determination method, for a decoder and comprising:
   parsing a bitstream to obtain a decoding parameter of a current block, the decoding parameter containing a parameter used in decoding the current block;
   determining a first template of the current block when the decoding parameter indicates that the current block uses a rotate template mode, the first template containing a neighbouring reconstructed sample of the current block;
   determining a reference region of the current block;
   determining in the reference region a matching template of the first template according to a reference template processing parameter, the reference template processing parameter being a parameter contained in the decoding parameter and used to construct the matching template;
   determining a matching block of the current block according to the matching template; and
   determining a prediction value of the current block according to the matching block,
   wherein the reference template processing parameter indicates a rotation angle; and
   determining in the reference region the matching template of the first template according to the reference template processing parameter comprises:
      constructing in the reference region at least one candidate template, wherein each candidate template has the same size and shape as the first template and is constructed with a candidate matching position in the reference region as a vertex; and
      rotating only the at least one candidate template according to the rotation angle around at least one candidate matching position, and determining the matching template according to the at least one candidate template and the at least one candidate template rotated.

2. The method of claim 1, wherein determining the first template of the current block comprises:
   determining, among neighbouring reconstructed samples of the current block, samples within a preset shape of the first template as samples in the first template, according to the preset shape.

3. The method of claim 1, wherein determining the reference region of the current block comprises:
   determining all or part of samples which have been reconstructed before decoding of the current block and contained in a picture where the current block is located as the reference region; or
   determining all or part of samples which have been reconstructed in pictures other than a picture where the current block is located as the reference region.

4. The method of claim 1, wherein determining the matching template according to the at least one candidate template rotated comprises:
   calculating matching differences between the at least one candidate template rotated and the first template, and determining a candidate template with a smallest matching difference as the matching template.

5. The method of claim 1, wherein determining the matching block of the current block according to the matching template comprises:
   determining matching samples contained in a region located in a position indicated by the matching template and of a same size as the current block as samples in the matching block, wherein a relative position between the matching template and the matching block is a same as a relative position between the current block and the first template.

6. The method of claim 4, wherein:
   the reference template processing parameter contains an initial angle value and an interval step-size value; and
   the rotation angle is a sum of an initial value equal to the initial angle value and an interval angle represented by the interval step-size value.

7. The method of claim 1, wherein determining the prediction value of the current block according to the matching block comprises:
   determining the matching block as the prediction value of the current block; or
   determining the prediction value of the current block by weighting sample values in the matching block with a linear model, wherein a parameter of the linear model is one of: a preset parameter, a parameter derived according to a preset rule, and a parameter of the linear model contained in the decoding parameter.

8. A prediction value determination method, for an encoder and comprising:
   determining data dependency between a current block and a first template of the current block, the first template containing a neighbouring reconstructed sample of the current block;
   using a rotate template mode when the data dependency is greater than or equal to a preset threshold;
   determining in the rotate template mode a reference region of the current block;
   determining in the reference region a matching template of the first template according to a reference template processing parameter;
   determining a matching block of the current block according to the matching template; and
   determining a prediction value of the current block according to the matching block,
   wherein the reference template processing parameter indicates a rotation angle; and determining in the reference region the matching template of the first template according to the reference template processing parameter comprises:
  constructing in the reference region at least one candidate template, wherein each candidate template has the same size and shape as the first template and is constructed with a candidate matching position in the reference region as a vertex; and
  rotating only the at least one candidate template according to the rotation angle around at least one candidate matching position, and determining the matching template according to the at least one candidate template and the at least one candidate template rotated.

9. The method of claim 8, wherein determining the first template of the current block comprises:
  determining, among neighbouring reconstructed samples of the current block, samples within a preset shape of the first template as samples in the first template, according to the preset shape.

10. The method of claim 8, wherein determining the reference region of the current block comprises:
  determining all or part of samples which have been reconstructed contained in a picture where the current block is located as the reference region; or
  determining all or part of samples which have been reconstructed in pictures other than a picture where the current block is located as the reference region.

11. The method of claim 8, wherein determining the matching template according to the at least one candidate template rotated comprises:
  calculating matching differences between the at least one candidate template rotated and the first template, and determining a candidate template with a smallest matching difference as the matching template.

12. The method of claim 8, wherein determining the matching block of the current block according to the matching template comprises:
  determining matching samples contained in a region located in a position indicated by the matching template and of a same size as the current block as samples in the matching block, wherein a relative position between the matching template and the matching block is a same as a relative position between the current block and the first template.

13. The method of claim 11, wherein:
the reference template processing parameter contains an initial angle value and an interval step-size value; and
the rotation angle is a sum of an initial value equal to the initial angle value and an interval angle represented by the interval step-size value.

14. The method of claim 8, wherein determining the prediction value of the current block according to the matching block comprises:
  determining the matching block as the prediction value of the current block; or determining the prediction value of the current block by weighting sample values in the matching block with a linear model, wherein a parameter of the linear model is one of: a preset parameter, and a parameter derived according to a preset rule.

15. A decoder, comprising:
at least one processor; and
a memory coupled to the at least one processor and storing at least one computer executable instruction thereon which, when executed by the at least one processor, causes the at least one processor to:
  parse a bitstream to obtain a decoding parameter of a current block, the decoding parameter containing a parameter used in decoding the current block;
  determine a first template of the current block when the decoding parameter indicates that the current block uses a rotate template mode, the first template containing a neighbouring reconstructed sample of the current block;
  determine a reference region of the current block;
  determine in the reference region a matching template of the first template according to a reference template processing parameter, the reference template processing parameter being a parameter contained in the decoding parameter and used to construct the matching template;
  determine a matching block of the current block according to the matching template; and
  determine a prediction value of the current block according to the matching block,
wherein the reference template processing parameter indicates a rotation angle and the at least one processor configured to determine in the reference region the matching template of the first template according to the reference template processing parameter is configured to:
  construct in the reference region at least one candidate template, wherein each candidate template has the same size and shape as the first template and is constructed with a candidate matching position in the reference region as a vertex, and rotate only the at least one candidate template according to the rotation angle around at least one candidate matching position and determine the matching template according to the at least one candidate template and the at least one candidate template rotated.

16. The decoder of claim 15, wherein the at least one processor configured to determine the first template of the current block is configured to:
  determine, among neighbouring reconstructed samples of the current block, samples within a preset shape of the first template as samples in the first template, according to the preset shape.

17. The decoder of claim 15, wherein the at least one processor configured to determine the reference region of the current block is configured to:
  determine all or part of samples which have been reconstructed before decoding of the current block and contained in a picture where the current block is located as the reference region; or
  determine all or part of samples which have been reconstructed in pictures other than a picture where the current block is located as the reference region.

18. The decoder of claim 15, wherein the at least one processor configured to determine the matching template according to the at least one candidate template rotated is configured to:
  calculate matching differences between the one or more candidate templates and the first template, and determine a candidate template with a smallest matching difference as the matching template.

* * * * *